United States Patent Office 3,062,909
Patented Nov. 6, 1962

3,062,909
FUEL CELL ELECTRODE
Paul Reutschi, Yardley, Pa., assignor to The Electric Storage Battery Company, a corporation of New Jersey
No Drawing. Filed June 6, 1960, Ser. No. 33,948
4 Claims. (Cl. 136—86)

This invention relates to fuel cells, more particularly to a new and improved fuel cell electrode and to methods of producing such electrode.

It is an object of the present invention to provide a fuel cell of high efficiency for operation at relatively low temperature, that is, at room temperature, such high efficiency being derived to a large extent from the new and improved fuel electrode used therein.

Prior to the present invention, fuel cells, devices which convert the free energy of chemical reactions directly into electricity, have operated at relatively high temperatures to produce substantial current output and for improved efficiency. Though low temperature fuel cell operation has been attained, much has been left to be desired in maintaining the voltage for current levels of substantial magnitude.

The present invention is particularly concerned with the provision of a fuel-cell electrode, which represents a different order of effectiveness and which provides an unexpectedly high voltage for given current output. More particularly, the fuel-cell electrode of my invention is characterized by the presence of a nickel-silver-palladium powder mixture in which the nickel and silver are generally the metals that are present in large amounts and the palladium is present in a minor proportion as a catalyst.

For further objects and advantages of the invention, a description of the methods of producing the preferred form of the electrode of the present invention, and for an outline of the ways of practicing the invention, reference is to be had to the following description and discussion of test results of electrodes embodying the invention.

Specifically, the electrode of the invention is designed to be used in a fuel cell designed to utilize oxidants and fuels, such as oxygen and hydrogen, respectively, as the reactants in an electrolyte consisting of an alkaline solution, generally an aqueous solution of potassium hydroxide. The present electrode is the one to which the hydrogen gas is fed and herein is designated as the fuel electrode. It may be used, advantageously in conjunction with an oxygen electrode comprising a silver-nickel alloy such as is disclosed in my copending application S.N. 832,978, filed August 11, 1959, and assigned to the assignee of the present application.

As is well understood by those skilled in the art, the manner in which the free energy of the chemical reaction between the gases and the electrolyte is directly converted into electricity can be expressed by the following equations:

At the oxygen electrode $$O_2 + 2H_2O + 4e \rightarrow 4(OH) \tag{1}$$

When oxygen is supplied to the oxygen electrode, hydroxyl ions are formed within the electrolyte. In forming such ions, there is utilized an electron, thus leaving the electrode positively charged or with a deficiency of electrons. The negatively charged hydroxyl ions are diffused through the electrolyte, or migrate through the electrolyte to the hydrogen electrode.

At the hydrogen electrode $$2(OH) - + H_2 \rightarrow 2H_2O + 2e \tag{2}$$

With hydrogen flowing to the hydrogen or fuel electrode, the hydrogen is ionized. It reacts with the hydroxyl ions to form water with release of electrons. Accordingly, if the electrodes are connected to an external circuit, current will flow. Thus, the fuel reactions are dependent upon the flow of electrons from the hydrogen electrode through the external circuit to the oxygen electrode. In accordance with a generally recognized convention, the oxygen electrode from the standpoint of the external circuit may be considered as the positive electrode, and the hydrogen or fuel electrodes as the negative electrode.

In the preferred form of the invention, the fuel electrode comprises a porous matrix consisting of sintered particles of metallic silver, nickel, and palladium. By the use of this electrode there has been attained an efficiency of conversion into electricity of the free energy of the chemical reaction of an unexpectedly higher order than with other fuel electrodes known to the art particularly when it is considered that such electrode operates at about room temperature and under normal atmospheric pressures.

The fuel electrode of the invention consists of the above mentioned composition in the broad proportions of from about 1% to about 47% by weight of metallic nickel, from about 96% to about 50% by weight of metallic silver and from about 3% to about 15% by weight of metallic palladium. It will be understood that electrodes having alloys containing such metals within the specified ranges exhibit the improved characteristics and enhanced efficiencies of the invention. Specifically, however, my preferred electrode contains about 10% metallic nickel, about 82.5% metallic silver, and about 7.5% metallic palladium, all proportions being by weight.

As exemplary of the improved results obtainable from the use of my electrode, reference is had to Table 1 showing test results of the more efficient electrode of my invention in comparison with those electrodes known to the prior art. These tests results are drawn from a series of discharges in which the electrodes were tested against mercury oxide electrodes in an alkaline electrolyte, namely, an aqueous solution of about 30% potassium hydroxide, at a temperature of 40° C. Hydrogen was supplied to the electrodes under a pressure of about 20 pounds per square inch absolute with atmospheric pressure on the opposite side of the electrode.

TABLE 1

Hydrogen Electrode Potential vs. HgO

| Electrode Composition | Current Density—Milliampere/cm.² | | |
|---|---|---|---|
| | 10 | 50 | 100 |
| 1. Nickel | −.615 | | |
| 2. Silver | | | |
| 3. 7 pts. Silver, 1 pt. Palladium | −.920 | −.825 | −.730 |
| 4. 6 pts. Nickel, 1 pt. Platinum | −.900 | −.730 | −.540 |
| 5. 5 pts. Nickel, 2 pts. Palladium | −.810 | −.420 | |
| 6. 7 pts. Silver, 1 pt. Platinum | −.925 | −.325 | −.680 |
| 7. 9½ pts. Silver, 1 pt. Nickel, ¾ pts. Palladium | −.925 | −.865 | −.795 |

Table 1 shows the results obtained when six prior art electrodes, electrodes 1 to 6, and an electrode in accordance with the present invention, electrode 7, all having similar pore sizes and effective areas, were discharged at current densities of 10, 50, and 100 milliamperes per square centimeter. Electrode 1 composed entirely of sintered nickel particles provided a potential of −.615 multiples at a current density of 10 milliamperes but was completely unstable at higher current densities. Electrode 2, the sintered silver electrode, was not satisfactory for hydrogen electrode operation at any of the current density tested. Electrode 3, comprising 7 parts of silver and 1 part of palladium, was the most satisfactory prior art electrode but as can be seen the potential of this electrode dropped to −.730 millivolts at a current density of 100 milliamperes per square centimeter. Electrode 4, a nickel-palladium electrode, showed even less efficiency than electrode 3 at the higher current densities. The same is true of electrode 5, which was completely unstable at the highest current density tested. Electrode 6 also gave unsatisfactory results at the higher current densities. Electrode 7, however, which was an electrode in accordance with the present invention, gave superior performance at all of the current densities tested giving a potential of −.795 millivolts, even when operating at the current density of 100 milliampere per square centimeter.

The method of preparing the electrodes is important if optimum results are to be obtained. Since the electrochemical reaction in a fuel cell occurs at the gas-electrode-electrolyte interface, a prime requisite is high porosity and uniformly small pore size whereby maximum surface area is obtained. A preferred way of producing my fuel electrode is to place a mold and press at a light pressure a mixture of finely divided metallic nickel powder, finely divided metallic silver powder and finely divided metallic palladium powder, within the proportions hereinbefore set forth. The particle size of the nickel powder is preferably about 1 micron, the particles of silver and palladium being about 5 microns. The firming pressure is from about 700 pounds per square inch to about 1000 pounds per square inch. For additional strength, a metallic screen, expanded metal, or other supporting member that will lend strength to the plaque but not inhibit the passage of gas therethrough may be embedded in the powder prior to pressing. The pressed plaque is then heated at a relatively low temperature to sinter the nickel and silver powder thus increasing the mechanical strength of the electrode. Low temperatures are preferred in order to retain high porosity within the electrode, a temperature of about 450° C. for a time period of about 20 minutes having been found to be satisfactory. Since the process of sintering involves a time-temperature relationship, however, higher temperatures for shorter periods of time can be utilized as well as lower temperatures for a longer period of time.

Though the above described fuel electrode is a preferred form, other types of fuel electrodes may be made that will embody the inventive concept herein set forth and will fall within the scope of the appended claims. Thus, the porous matrix may be formed by sintering other metal powders, such as copper, thereby forming a porous matrix and then coating the walls of the pores with the desired nickel-silver-palladium alloy as by electro-deposition therein. Furthermore, a porous matrix comprising a porous refractory or ceramic material that is then coated with the nickel-silver-palladium alloy can also be utilized.

I claim:

1. A fuel electrode for fuel cells comprising a porous matrix, at least the pore surfaces of said matrix consisting of a nickel-silver-palladium alloy in which nickel is present in an amount by weight of the alloy of from about 1% to about 47%, silver is present in an amount by weight of the alloy of from about 50% to about 96%, and palladium is present in an amount by weight of the alloy from about 3% to about 15%.

2. The electrode of claim 1 in which nickel is present in an amount by weight of about 10%, silver is present in an amount by weight of about 82.5%, and palladium is present in an amount by weight of about 7.5%.

3. A fuel electrode for fuel cells comprising a porous metallic matrix consisting of nickel, silver and palladium, the nickel being present in an amount by weight of said alloy of from about 1% to about 47%, the silver being present in an amount by weight of said alloy of from about 50% to about 96%.

4. The electrode of claim 3 in which the nickel is present in an amount of about 10%, the silver is present in an amount of about 82.5%, and the palladium is present in an amount by weight of about 7.5%.

References Cited in the file of this patent

UNITED STATES PATENTS

| | | |
|---|---|---|
| 2,384,463 | Gunn et al. | Sept. 11, 1945 |
| 2,615,930 | Moulton et al. | Oct. 28, 1952 |
| 2,737,541 | Coolidge | Mar. 6, 1956 |
| 2,860,175 | Justi | Nov. 11, 1958 |

FOREIGN PATENTS

| | | |
|---|---|---|
| 806,591 | Great Britain | Dec. 31, 1958 |